(12) United States Patent
Wang et al.

(10) Patent No.: US 9,544,941 B2
(45) Date of Patent: Jan. 10, 2017

(54) AIR LINK UP/DOWN PROTOCOL (ALUDP)

(75) Inventors: Lei Wang, San Diego, CA (US);
Ronald G. Murias, Calgary (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 359 days.

(21) Appl. No.: 13/173,858

(22) Filed: Jun. 30, 2011

(65) Prior Publication Data

US 2012/0002621 A1   Jan. 5, 2012

Related U.S. Application Data

(60) Provisional application No. 61/360,621, filed on Jul. 1, 2010.

(51) Int. Cl.

| | | |
|---|---|---|
| *H04W 4/00* | (2009.01) | |
| *H04W 76/04* | (2009.01) | |
| *H04W 76/02* | (2009.01) | |
| H04W 24/00 | (2009.01) | |
| H04W 24/04 | (2009.01) | |
| H04W 48/16 | (2009.01) | |
| H04W 72/04 | (2009.01) | |
| H04W 88/08 | (2009.01) | |

(52) U.S. Cl.
CPC ......... *H04W 76/045* (2013.01); *H04W 76/028* (2013.01); *H04W 24/00* (2013.01); *H04W 24/04* (2013.01); *H04W 48/16* (2013.01); *H04W 72/04* (2013.01); *H04W 76/048* (2013.01); *H04W 88/08* (2013.01)

(58) Field of Classification Search
CPC .. H04W 28/04; H04W 36/0055; H04W 88/08; H04W 72/04; H04W 48/12; H04W 36/0083; H04W 76/028; H04W 36/08; H04W 36/00; H04W 72/0413; H04W 72/1284

USPC ................................................. 370/328–329

See application file for complete search history.

(56) References Cited

U.S. PATENT DOCUMENTS

| | | | |
|---|---|---|---|
| 8,396,032 B2 | 3/2013 | Kato et al. | |
| 2005/0124334 A1* | 6/2005 | Rajkotia | 455/422.1 |
| 2007/0232339 A1* | 10/2007 | Ji et al. | 455/502 |

(Continued)

FOREIGN PATENT DOCUMENTS

| | | |
|---|---|---|
| WO | 03/013163 A1 | 2/2003 |
| WO | 2005/036917 A1 | 4/2005 |
| WO | 2006/110445 A1 | 10/2006 |

OTHER PUBLICATIONS

IEEE: "IEEE P802.16m/D6 May 2010 Part 16: Air Interface for Fixed and Mobile Broadband Wireless Access System," cited May 22, 2010, pp. 0, 36, 85, 374-383, 423-426, 695-696, IEEE, 3 Park Avenue, New York, New York 10016/5997, USA retrieved on Mar. 22, 2013 via URL: http://ieeexplore.ieee.org/stamp/stamp.jsp?arnumber=05510226.*

(Continued)

*Primary Examiner* — Melanie Jagannathan
*Assistant Examiner* — Najeebuddin Ansari
(74) *Attorney, Agent, or Firm* — Volpe and Koenig, P.C.

(57) ABSTRACT

An air link up/down protocol (ALUDP) may be Synchronized ALUDP (S-ALUPD) or Non-Synchronized ALUDP (NS-ALUDP). A method for wireless communications includes monitoring and managing the air link status between a Subscriber Station (SS) and a Base Station (BS).

14 Claims, 9 Drawing Sheets

(56) References Cited

U.S. PATENT DOCUMENTS

| | | | |
|---|---|---|---|
| 2008/0123576 A1* | 5/2008 | Son | H04W 52/0225 |
| | | | 370/311 |
| 2009/0225709 A1* | 9/2009 | Wager et al. | 370/329 |
| 2010/0067476 A1* | 3/2010 | Periyalwar et al. | 370/329 |
| 2011/0090856 A1* | 4/2011 | Cho et al. | 370/329 |
| 2011/0194420 A1* | 8/2011 | Park et al. | 370/242 |
| 2011/0194531 A1* | 8/2011 | Park et al. | 370/331 |
| 2011/0223905 A1* | 9/2011 | Lee et al. | 455/423 |
| 2012/0014355 A1* | 1/2012 | Jung et al. | 370/331 |

OTHER PUBLICATIONS

Draft Amendment to IEEE Standard for Local and metropolitan area networks; Part 16: Air Interface for Fixed and Mobile Broadband and Wireless Access Systems, IEEE P802.16m/D6 (May 2010).

IEEE Standard for Local and metropolitan area networks; Part 16: Air Interface for Broadband Wireless Access Systems, IEEE Std. 802.16/2009 (May 2009).

WiMAX Forum Mobile System Profile Specification, Release 1—IMT-2000 Edition (Aug. 2009).

IEEE Standard for Local and metropolitan area networks; Part 16: Air Interface for Fixed and Mobile Broadband and Wireless Access Systems, Amendment 2: Physical and Medium Access Control Layers for Combined Fixed and Mobile Operation in Licensed Bands and Corrigendum 1, IEEE Std. 802.16e-2005 (Feb. 2006).

Srinivasan et al., "IEEE 802.16m System Description Document (SDD)," IEEE 802.16 Broadband Wireless Access Working Group, IEEE 802.16m-09/0034r2 (Sep. 2009).

\* cited by examiner

AIR LINK UP/DOWN PROTOCOL (ALUDP)

CROSS REFERENCE TO RELATED APPLICATIONS

This application claims the benefit of U.S. Provisional 61/360,621 filed Jul. 1, 2010, which is incorporated by reference as if fully set forth.

FIELD OF INVENTION

This application is related to wireless communications.

BACKGROUND

In an advanced broadband wireless system, an air link refers to a communication channel between the BS (Base Station) and a SS (Subscriber Station) using the air as media. At a lower layer, the air link status may determine whether or not the upper layer data may be transported over the air between the two ends of the air link. If the data may be transported, the air link is considered "up;" otherwise, the air link is considered "down." The air interface may be used by the subscriber device if the air link is up. The system may monitor, report, and manage the air link status.

SUMMARY

A base station (BS) comprises a coverage loss detection timer associated with a base station; a mobile station; a transmitter configured to, on a condition that the coverage loss detection timer expires, transmit an uplink (UL) allocation to the mobile station; a receiver configured to receive packet data from the mobile station via the UL allocation; and a processor configured to reset the coverage loss detection timer; wherein the transmitter is further configured to transmit a message to the mobile station for resetting a periodic ranging timer of the mobile station.

BRIEF DESCRIPTION OF THE DRAWINGS

A more detailed understanding may be had from the following description, given by way of example in conjunction with the accompanying drawings wherein.

DETAILED DESCRIPTION

Introduction

Figure 1A:
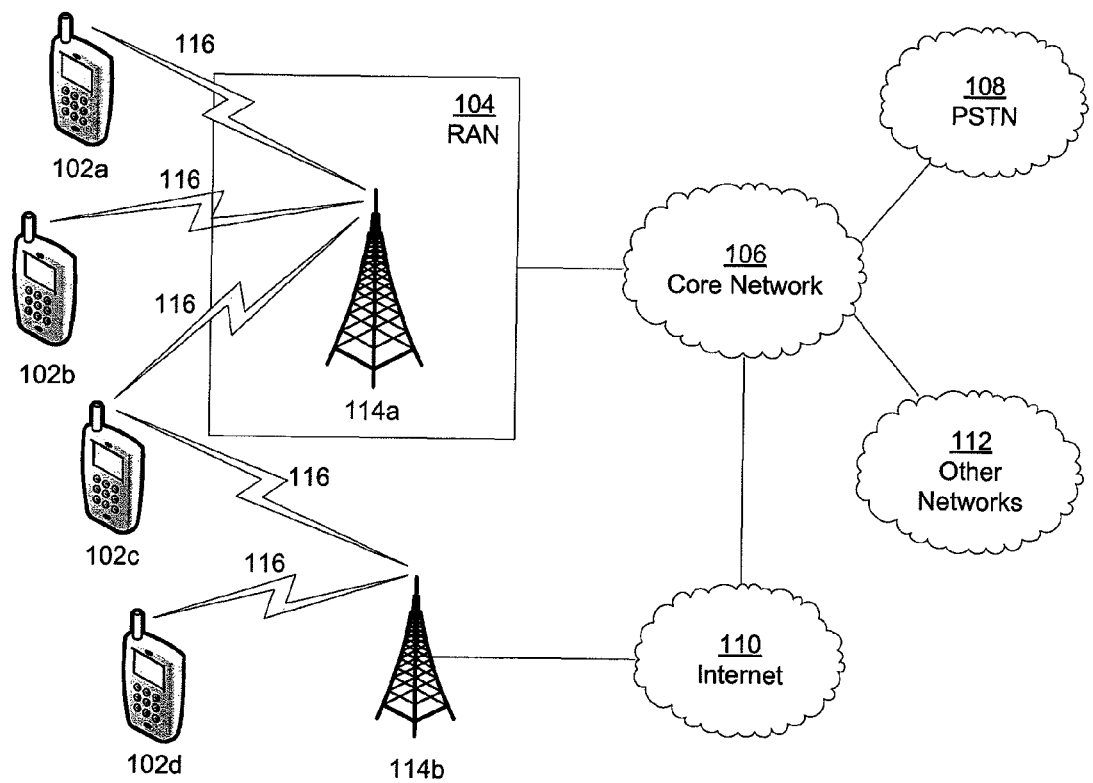
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
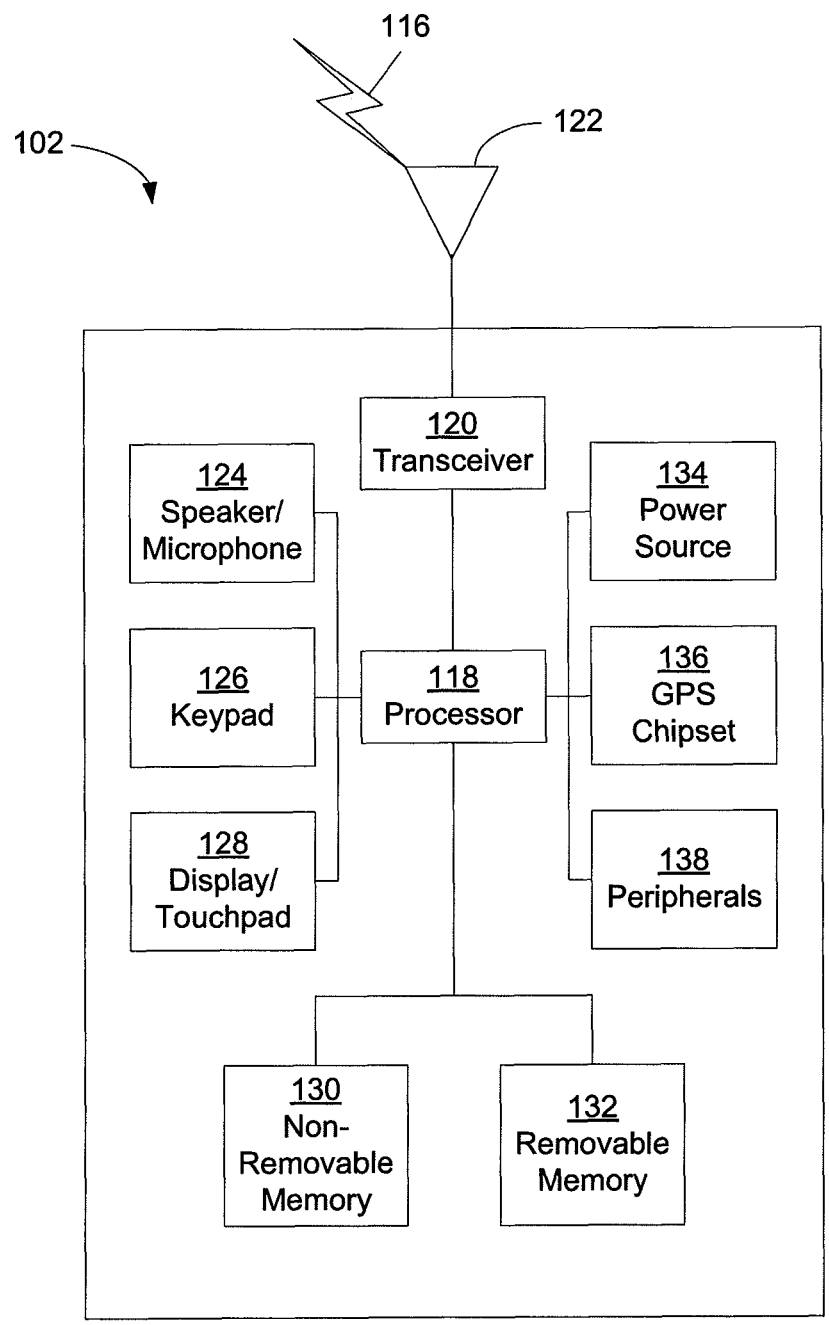
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
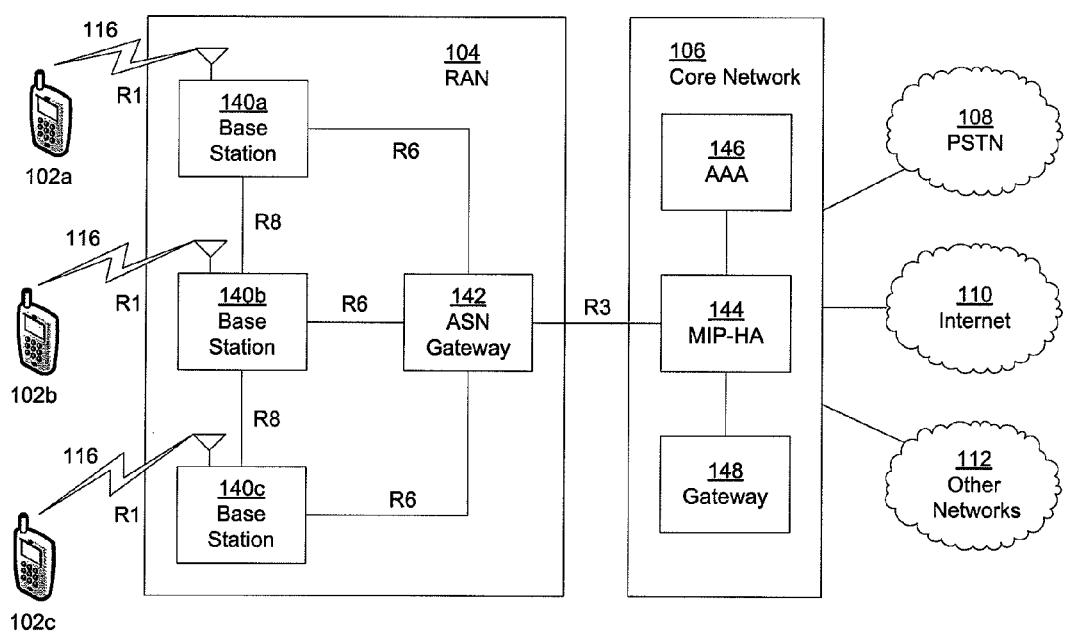
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Properties of Air Link Status Monitoring and Management

Specified protocols and procedures do not exist for systematically monitoring, reporting, and managing the air link status in wireless communications (for example, in 802.16e or in the 802m draft standard). However, there may be discrete relevant pieces in, for example, 802.16e or the 802m draft standard. For example, in the current 802.16m draft standard, there are two independent procedures, Periodic Ranging and Coverage Loss Detection, which may be relevant to air link status monitoring and management. The Periodic Ranging procedure may be defined to maintain the uplink (UL) synchronization with the BS for SSs. This may be accomplished by having the SSs periodically send a contention-based periodic ranging code on a periodic ranging channel to the BS and having the BS send a response with the UL status and the requisite UL transmission parameter adjustments. The Coverage Loss Detection procedure may be defined for the BS to detect whether the SS is still connected to the BS, for example, by having the BS invite the SS to transmit after a certain period of silence from the SS.

There may also be two independent procedures (for example, the 802.16e procedures), Periodic Ranging and Sleep-mode Keep-alive checking, that may have functions relevant to air link status monitoring and management. The 802.16e Periodic Ranging procedure may be similar to the 802.16m periodic ranging procedure, in that it is defined to maintain the UL synchronization between the SS and the BS through a random access-based periodic ranging channel and UL transmission parameter adjustments instructed by the BS. The Sleep-mode Keep-alive checking procedure may be defined for the BS to check whether a sleep-mode MS is still connected to the BS, for example, by requesting the MS to transmit in a given listening window during the sleep mode.

Several properties are present in the current procedures for air link status monitoring and management. First, the two mechanisms are disconnected. While periodic ranging and coverage loss detection are related to air link status monitoring and management, they are disconnected from each other for several reasons: (1) periodic ranging is used for the SS to maintain its UL sync with the BS, and the SS maintains a periodic ranging timer for its periodic ranging process. Also, in the periodic ranging process, the BS has no knowledge of which SS is conducting periodic ranging. Therefore, the BS may start its coverage loss detection procedure with the same SS following the SS's periodic ranging procedure; (2) the coverage loss detection procedure is controlled by a timer, called Active_ABS_timer, at the BS. The execution of the coverage loss detection procedure may not have any impact on the SS-side controlled periodic ranging process; and (3) the two timers, periodic ranging timer at SS and Active-ABS_timer at BS, are independent. Cooperation between the two timers may improve the system efficiency.

Second, there may be limited mechanisms to handle the interleaving issues between the air link status monitoring and management and the pre-scheduled SS absence intervals, for example, scanning intervals, sleep intervals, etc.

Third, in the coverage loss detection procedure, the BS may instruct the SS to use the periodic ranging code/channel. After receiving an AAI_RNG-ACK with a successful status, the SS may send a bandwidth request to the BS for an UL allocation for the SS to send the SS's identification information. Using a dedicated periodic ranging code may save the steps of UL bandwidth request, UL bandwidth allocation, and the SS's identification transmission. Alternatively or additionally, the BS may provide the SS with a unicast UL allocation by using a CDMA allocation information element (IE), allowing the step of bandwidth request to be avoided.

Fourth, periodic ranging may trigger when the SS has active UL transmissions. Based on the current 802.16m draft standard, on a condition that the SS is active with data traffic and there is no need to use periodic ranging to adjust the SS's UL transmission parameters, the SS's periodic ranging timer may still run and may trigger the SS to conduct periodic ranging, which may be unnecessary.

DESCRIPTION

A systematic mechanism for the air link monitoring and management may be desirable, which may unify the current two disconnected mechanisms: periodic ranging and coverage loss detection. It may be desirable to make the two mechanisms work together in a cooperative way and address the interleaving issues regarding the pre-scheduled SS absence intervals. In addition, enhancements for the current periodic ranging and coverage loss detection mechanisms may also be needed.

In an embodiment, a protocol called Air Link Up/Down Protocol (ALUDP), may monitor, report, and manage the air link status in a systematic way and in a cooperative way between the two parties of the air link (for example, BS and SS/MS in 802.16e systems, or ABS and AMS in 802.16m systems).

In another embodiment, mechanisms to handle the interleaving between the air link status monitoring/management and the pre-scheduled SS absence intervals are described. For example, this may be during scanning intervals, during sleep intervals, or during handover (HO) procedures.

In another embodiment, enhancements to the current Coverage Loss Detection mechanism are described. Enhancements may include using a dedicated periodic ranging opportunity when periodic ranging is needed in the coverage detection process; using an enhanced periodic channel with which the SS's station identifier (STID) information is embedded in the periodic ranging request; and providing unsolicited unicast UL allocation to the SS for it to send its identification information following a successful periodic ranging.

In another embodiment, enhancements to the current periodic ranging mechanism (for example, in 802.16m) are described. Enhancements may include using a periodic ranging timer at the BS side and resetting the SS's periodic ranging timer on a condition that the SS has accomplished a successful UL transmission.

Each of these embodiments will now be described in greater detail.

Air Link Up/Down Protocol (ALUDP)

The Air Link Up/Down Protocol (ALUDP) may be designed to monitor and manage the air link status between an SS and a BS in a cooperative and systematic way. At the BS side, the ALUDP may require the BS to: (1) transmit downlink (DL) control signals to the SS for the SS to synchronize at the DL, for example, preambles, superframe headers, etc.; (2) monitor the UL and provide the necessary UL transmission parameter adjustments to the SS for the SS to synchronize at the UL; or (3) monitor and manage the air link status, for example, Up, Down, Scheduled-Absence, etc. At the SS side, the ALUDP may require the SS to: (1) monitor the DL control channel to keep synchronized with the BS at the DL; (2) transmit in the UL direction as scheduled/instructed by the BS, so that its UL quality can be measured by the BS; (3) adjust UL transmission parameters to keep its UL synchronized with the BS; or (4) monitor and manage the air link status, for example, Up, Down, Scheduled-Absence, etc.

Two basic variants of the Air Link Up/Down Protocol may be used: Synchronized ALUDP (S-ALUPD) and Non-Synchronized ALUDP (NS-ALUDP). The variants are described below.

Synchronized Air Link Up/Down Protocol (S-ALULP)

The Synchronized Air Link Up/Down Protocol (S-ALUDP) may use one unified procedure governed by a single timer or coordinated timers. It may monitor and report the air link status at both sides of the air link, where one side may act as the Master, which manages and controls the execution of the S-ALUDP functions.

Figure 2:
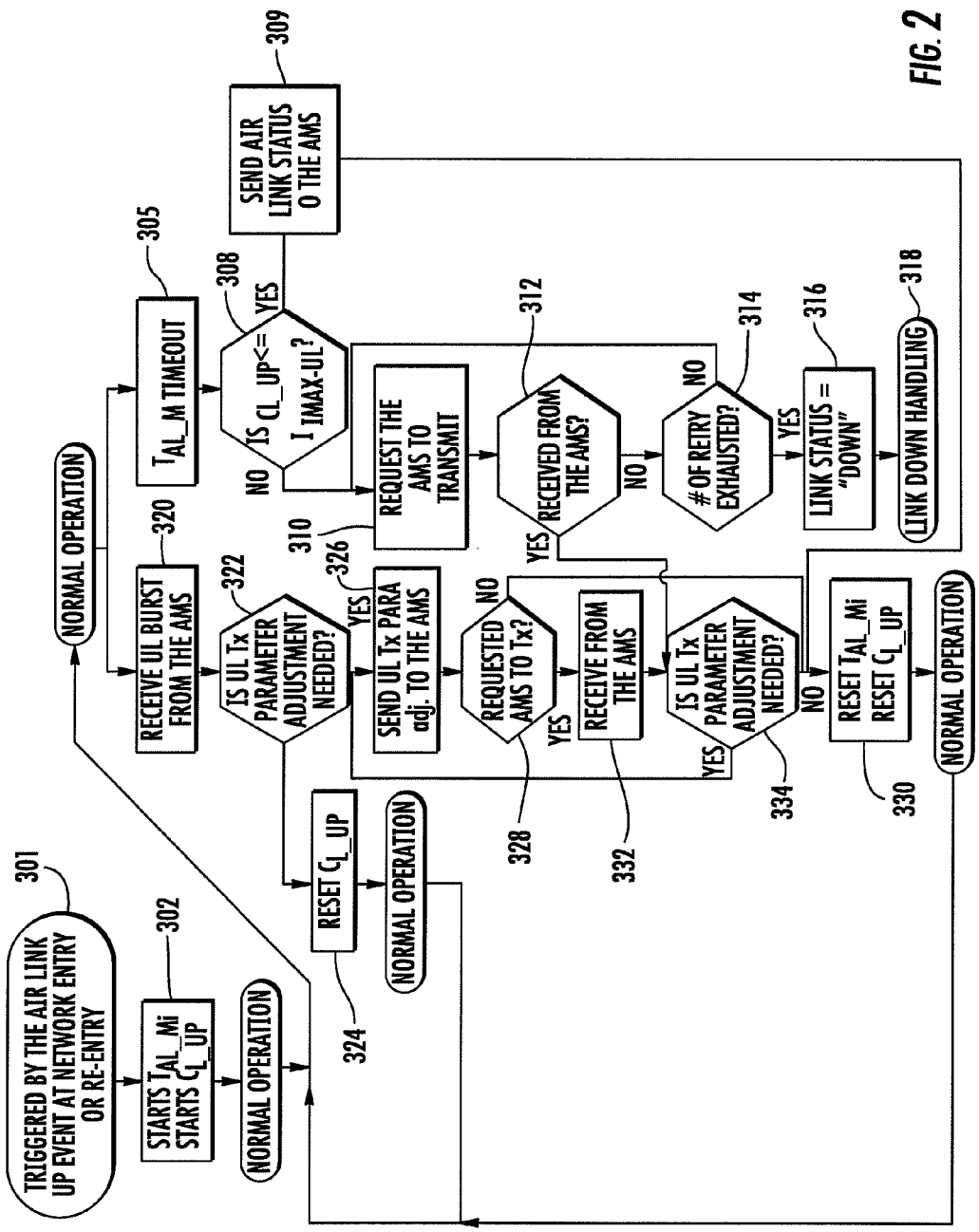
FIG. 2 is a flow diagram of the S-ALUDP BS-side procedure.
Figure 3:
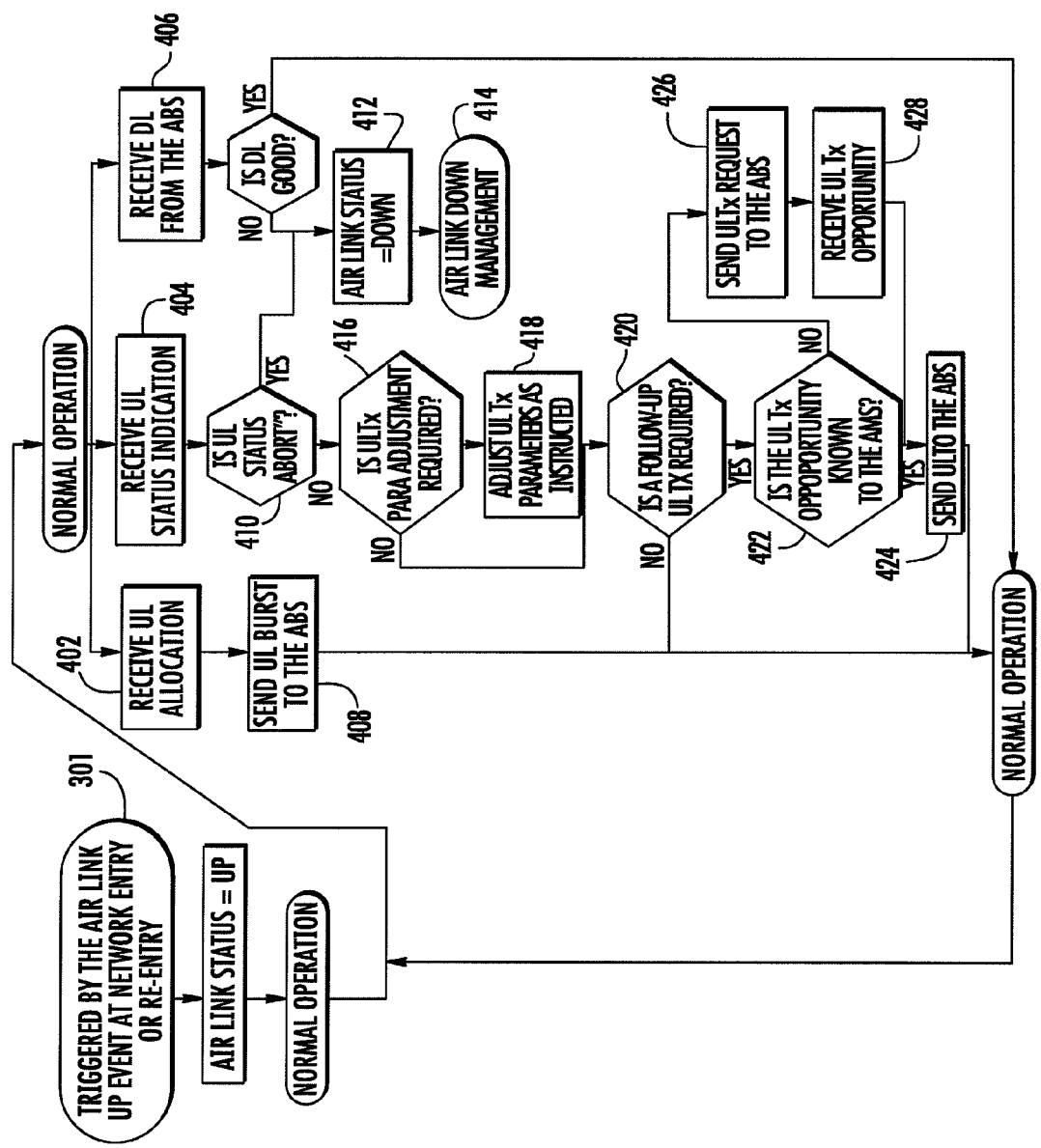
FIG. 3 is a flow diagram of the S-ALUDP SS-side procedure.

The following describes an example of the S-ALUDP, which has the BS as the Master and uses one timer and one counter at the BS to manage the execution of the S-ALUDP. FIG. 2 is a flow diagram of the S-ALUDP at the BS side and FIG. 3 is a flow diagram of the S-ALUDP at the SS side.

The S-ALUDP may use a timer at its Master side called Air Link Monitoring timer, $T_{AL\_M}$, which is the interval between two executions of the air link monitoring procedure. As shown in FIG. 2, the timer, $T_{AL\_M}$, may be started 302 on a condition that the air link is up to normal operation at network entry or re-entry 301. Upon a timeout 305, the timer may trigger the BS to initiate the air link monitoring actions. It may reset on a condition that link status information, with or without UL transmission parameter adjustments, is sent to the SS.

The S-ALUDP may also use a counter, called last UL traffic elapse-time counter, $C_{L\_UP}$, which may record the time that has elapsed since it last received UL traffic from the SS. As shown in FIG. 2, the counter, $C_{L\_UP}$, may be started on a condition that the air link is up to normal operation at network entry or re-entry. It may reset every time an UL burst from the SS is received correctly. Upon being triggered by a $T_{AL\_M}$ timeout event, the BS may start the link status checking actions. It may first check whether the counter, $C_{L\_UP}$, is less than or equal to a predefined threshold value, $I_{MAX\_UL}$ 308, which may be the maximum interval that the air link status may remain valid since the previous UL reception. If $C_{L\_UP}<=I_{MAX\_UL}$, the BS may send the previously collected air link status information to the SS 309 and the BS may reset the counter $C_{L\_UP}$ and $T_{AL\_M}$ 330. Otherwise, the BS may need to invite the SS to transmit 310 to determine the air link status.

If the BS requests the SS to transmit its air link status 310, the BS will look to receive that status 312. If the BS does not receive the air link status, it looks to whether a maximum number of retries have been exhausted 314. If the maximum number of retries has not been exhausted, the procedure returns to the request step 310. If the number of retries has been exhausted, a link status "down" indication is sent 316 and a link down procedure is initiated 318.

If the air link burst is received from the SS, the BS looks to step 334 and whether the UL Tx parameter needs adjustment.

Upon receipt of a UL Burst from the SS 320 the BS may identify whether a transmission parameter adjustment is required 322. If no adjustment is needed, the BS may reset the counter $C_{L\_UP}$ 324 and resumes normal operation. If adjustment is required, the BS may send the UL Tx parameter adjustment to the SS 326 and either requests the SS to transmit or not 328. If not, the BS may reset the counter $C_{L\_UP}$ and $T_{AL\_M}$ 330 and resumes normal operation. If the SS requests the SS to transmit, the BS may receive data from the SS 332 and determines if further UL Transmission parameter adjustment is needed 334. If further adjustment is needed the process returns to step 326. If no further adjustment is needed, the BS may reset the counter $C_{L\_UP}$ and $T_{AL\_M}$ 330 and then resume normal operation.

FIG. 3 shows the S-ALUDP procedure at the slave side of the S-ALUDP (the SS in the given example). The SS may monitor the DL to determine its air link status 301. For UL synchronization with the BS, the SS may depend on the master side of the S-ALUDP, for example, the BS, to provide link status information and UL transmission parameter adjustments.

In normal operation, the SS receives a UL allocation 402, a UL status indication, 404, or a DL from the BS 406. If the SS receives a UL allocation 402, the SS may send a UL burst to the BS 408 and resumes normal operation.

If the SS receives a UL status indication, the SS checks to see if the status is abort 410; if the status is abort, the air link status is down 412 and the SS initiates the air link down management procedure 414. If the UL status is not abort, the SS may check to see if UL transmission adjustment is required 416. If adjustment is required, the SS may adjust the UL transmission parameters as instructed 418.

Then, and also if no adjustment was required, the SS may check to see if a follow-up UL transmission is required 420. If not, the SS resumes normal operation. If UL transmission is required, the SS checks to see if the UL transmission opportunity known to the SS 422. If yes, the SS sends the UL to the BS 424 and resumes normal operation. If the UL transmission opportunity is not known the SS, the SS may send a UL transmission request to the BS 426, and receive a UL transmission opportunity 428, thereafter performing step 424: sending the UL to the BS and resuming normal operation.

Non-Synchronized Air Link Up/Down Protocol (NS-ALULP)

The Non-Synchronized Air Link Up/Down Protocol (NS-ALUDP) may comprise two or more non-synchronized but cooperative air link monitoring and management procedures. "Non-synchronized" may mean that the air link monitoring and management procedures may be optimized for specific functions and may be controlled or triggered by the mechanism's own events and/or timers. "Cooperative" may mean that the cooperation mechanisms may be used in the air link monitoring and management procedures to improve the system efficiency.

Described below is an example of a NS-ALUDP in the context of 802.16m systems. It may comprise the following basic components: (1) a Periodic Ranging Procedure controlled by an SS timer, Periodic Ranging Timer, denoted as $T_{PR-SS}$; (2) a Coverage Loss Detection procedure controlled by a BS timer, Coverage Loss Detection Timer, denoted as $T_{CLD-BS}$; (3) cooperation mechanisms between the periodic ranging procedure and the coverage loss detection procedure; (4) a reporting mechanism for link status; (5) a statistic collection mechanism for link status measurements; or (6) a Link-Down exception handling mechanism.

Cooperation mechanisms between the periodic ranging procedure and the coverage loss detection procedure may include either of the following. First, in the periodic ranging procedure triggered by the $T_{PR-SS}$ timeout event, the SS may identify itself so that the BS knows who or what is conducting a periodic ranging procedure. It may then reset its coverage loss detection timer $T_{CLD-BS}$. Thus, the periodic ranging procedure may also help the BS collect the SS status information, and the number of time-outs of the coverage loss detection timer $T_{CLD-BS}$ may be effectively reduced. Second, in the coverage detection procedure triggered by the $T_{CLD-BS}$ timeout event, the BS may provide the SS ranging status information and UL transmission parameter adjustments, so that the SS may reset the periodic ranging timer $T_{PR-SS}$, upon receiving the ranging status information from the BS. Thus, the coverage loss detection procedure may also help the SS maintain its UL synchronization with the BS, and the number of time-outs of the periodic ranging timer $T_{PR-SS}$ may be effectively reduced.

Figure 4:
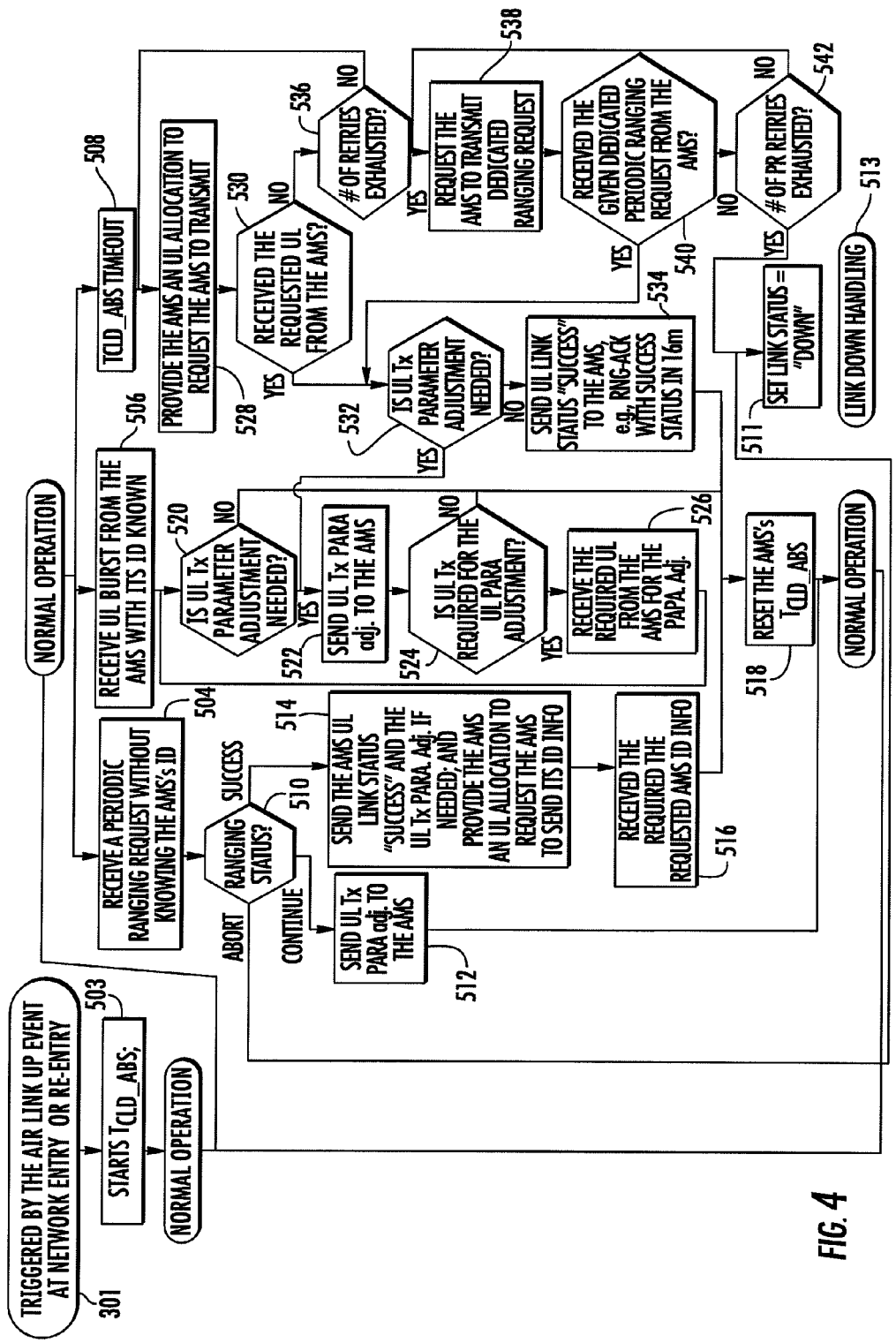
FIG. 4 is a flow diagram of the NS-ALUDP BS-side procedure.

FIG. 4 is a flow diagram for the above proposed NS-ALUDP procedure at a base station. Upon an air link up event at network entry or re-entry 301, the BS may start the Coverage Loss Detection Timer $T_{CLD-BS}$ 503 and begin normal operation. In normal operation, the BS may receive a periodic ranging request without knowing the SS's identification 504, receive a UL burst from the SS with the identification known 506, or have a timer $T_{CLD-BS}$ timeout 508.

If the BS receives a ranging request without knowing the SS's ID 504, the BS first determines the ranging status 510. If the ranging status is "abort", it may set the link status to down 511 and begin the link handling procedure 513. if the status is "continue", then the BS sends the UL transmission parameter adjustment to the SS 512 and resumes normal operation. If the ranging status is successful the BS may send the SS link status "success" and the UL transmission parameters may be adjusted if needed. The BS also may provide the SS a UL allocation to request the SS to send its ID information 514. The SS may then receive the required requested SS ID 516 and resets the SS's $T_{CLD-BS}$ 518 and resumes normal operation.

Returning to the BS's receipt of a UL burst from the SS with the SS ID known 506, the BS may then check when the UL transmission parameter adjustment is needed 520. If no adjustment is needed, the resets the SS's $T_{CLD-BS}$ 518 and resumes normal operation. If adjustment is needed, the BS may send the UL transmission adjustment parameter to the SS 522 and the BS checks if the UL transmission is required for the UL parameter adjustment 524. If not, the SS resets the $T_{CLD-BS}$ 518 and resumes normal operation. If yes, the SS receives required UL from the SS after SS's UL transmission parameter adjustment 526 and the procedure returns to step 520.

If the SS's $T_{CLD-BS}$ times out 508, the BS provides a UL allocation to the SS to request the SS to transmit 528 and may then check whether the BS received the requested UL from the SS 530. If yes, the BS may then check if the UL transmission parameter adjustment is needed 532. If yes, the procedure returns to step 522. If no, the BS sends the UL status "success" to the SS (e.g., in RNG-ACK message) 534. If the BS does not receive the requested UL from the SS, the BS checks if the number of retries has been exceeded 536. If not, the procedure may return to step 528. If yes the BS may request the SS to transmit a dedicated ranging request 538. The BS may then check whether it has received the dedicated ranging request from the SS 540. If yes, the procedure returns to step 532 of checking for parameter adjustment necessity. If no, the SS checks to see if the number of retries is exhausted 542 and if no, step 538 is repeated. If yes, the procedure returns to steps 511 and 513 and the link down handling procedure.

Figure 5:
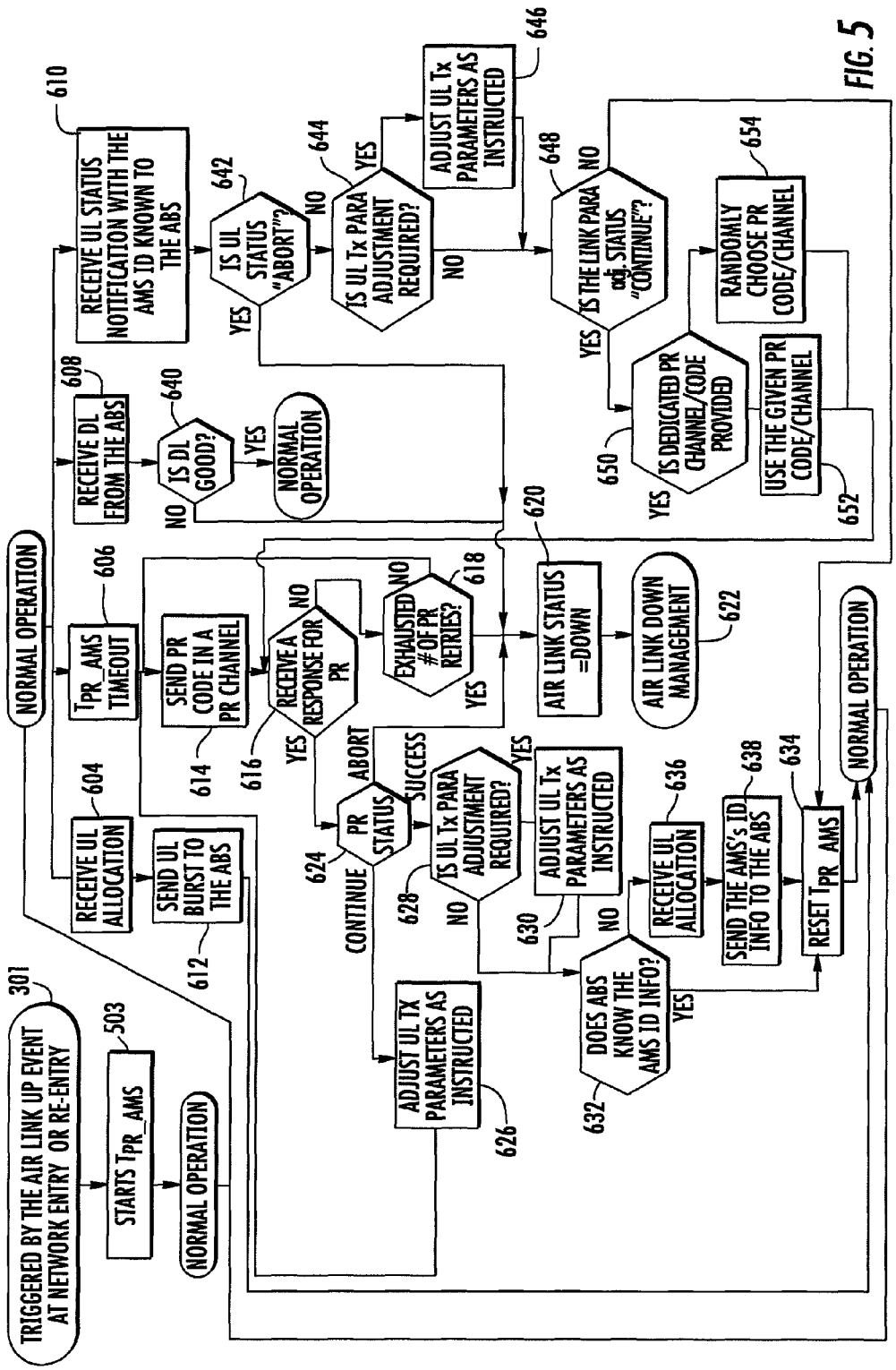
FIG. 5 is a flow diagram of the NS-ALUDP SS-side procedure.

FIG. 5 is a flow diagram for the above proposed NS-ALUDP procedure at a subscriber. Upon an air link up event at network entry or re-entry 301, the SS may start the Coverage Loss Detection Timer $T_{PR\_SS}$ 602 and begin normal operation.

In normal operation, the SS may receive a UL allocation 604, have a $T_{PR\_SS}$ timeout 606, receive a downlink from the BS 608, or receive a UL status notification with the SS ID known to the BS 610.

If the SS receives the UL allocation 604, it may then send an UL burst to the BS 612 and resume normal operation.

If the timer $T_{PR\_SS}$ times out, the SS may then sent a PR code in a PR channel 614 and then check for receipt of a response for the PR 616. If no, the SS may check to see if it has exhausted the number of PR retries 618 and if it has, the air link status may be set to down 620 and the air link down management procedure may be started 622. If the number of PR retries has not been exhausted 618, the procedure returns to step 614.

If the SS receives a response for PR, the SS checks the PR status 624. If the PR status is abort, the SS may set the air link status to down 620 and begin the air link down management procedure 622. If the PR status is continue, the SS adjusts the UL transmission parameters as instructed 626 and returns to step 614. If the PR status is success, the SS checks whether the UL transmission parameter adjustment is required 628. If yes, the SS may adjust the transmission parameters as instructed 630 and then the SS checks whether the BS knows the SS ID info 632. The procedure may arrive at step 632 when no UL transmission adjustment is required in step 628.

If the BS knows the SS ID information, it may reset the $T_{PR\_SS}$ 634 and resume normal operation. If the BS does not know the SS ID, it may look to receive the UL allocation 636 and send the SS's ID to the BS 638, after which the SS resets $T_{PR\_SS}$ in step 634 and resume normal operation.

In normal operation, when the SS receives DL from the BS 608, it first checks whether the DL is good 640. If yes, the SS resumes normal operation. If no, the air link status may be set to down 620 and the air link down management procedure may be started 622.

In normal operation, when the SS receives a UL status notification with the SS ID known to the BS 610, it first checks if the UL status is abort 642 and if it is, it may set the air link status to down 620 and begin the air link down management procedure 622. If the UL status is not abort, the SS may check whether the UL transmission parameter needs to be adjusted 644. If it does, the SS adjusts the UL transmission parameters 646, and then checks if the status is "continue" 648. If no UL transmission parameter adjustment is required, the SS also may arrive at step 648 checking if the link parameter adjustment status is "continue". If not, the SS resets $T_{PR\_SS}$ 634 and resumes normal operation. If yes, the SS checks if a dedicated PR channel/code is provided 650. If yes, the SS may use the given PR channel/code 652 and sends the PR channel/code in step 614. If the PR channel/code is not provided, the SS may randomly choose the PR channel/code 654 before sending it in step 614.

FIG. 4 and FIG. 5 provide an example in the context of 802.16m. It should be noted that the proposed NS-ALUDP can also be applied to 802.16e systems and other scheduled-based wireless access systems. In FIG. 4 and FIG. 5, the NS-ALUDP procedures (Periodic Ranging (PR) and the Coverage Loss Detection (CLD)), may be controlled by two timers: $T_{PR\text{-}SS}$ and $T_{CLD\text{-}BS}$, at the SS and BS, respectively. Each may be configured to the values optimized for its own specific function.

The two procedures, PR and CLD, may cooperate with each other by providing notifications to share the air link status information. For example, in the coverage loss detection procedure, on a condition that BS receives the UL data from the SS as requested due to the $T_{CLD\text{-}BS}$ timeout event, the BS may send a unicast unsolicited RNG-ACK so that the SS may reset its periodic ranging timer $T_{PR\text{-}SS}$. In the periodic ranging procedure, on a condition that the periodic ranging is a "success", the BS may provide the SS with a unicast UL allocation for the SS to send its identification information, so that the BS may reset its CLD timer $T_{CLD\text{-}BS}$.

Additionally or alternatively, in the CLD procedure, the BS may provide a dedicated periodic ranging opportunity for the SS on a condition that the SS is requested to transmit in the ranging channel. Thus, the SS's identification information may be kept known to the BS, so that the SS may not need to use the contention-based bandwidth request for a unicast UL allocation to send its identification information to the BS. The dedicated PR opportunity mechanism may save multiple steps in a CLD procedure, a contention-based bandwidth request, a grant, and/or an UL transmission with the SS's identification information.

Figure 6A:
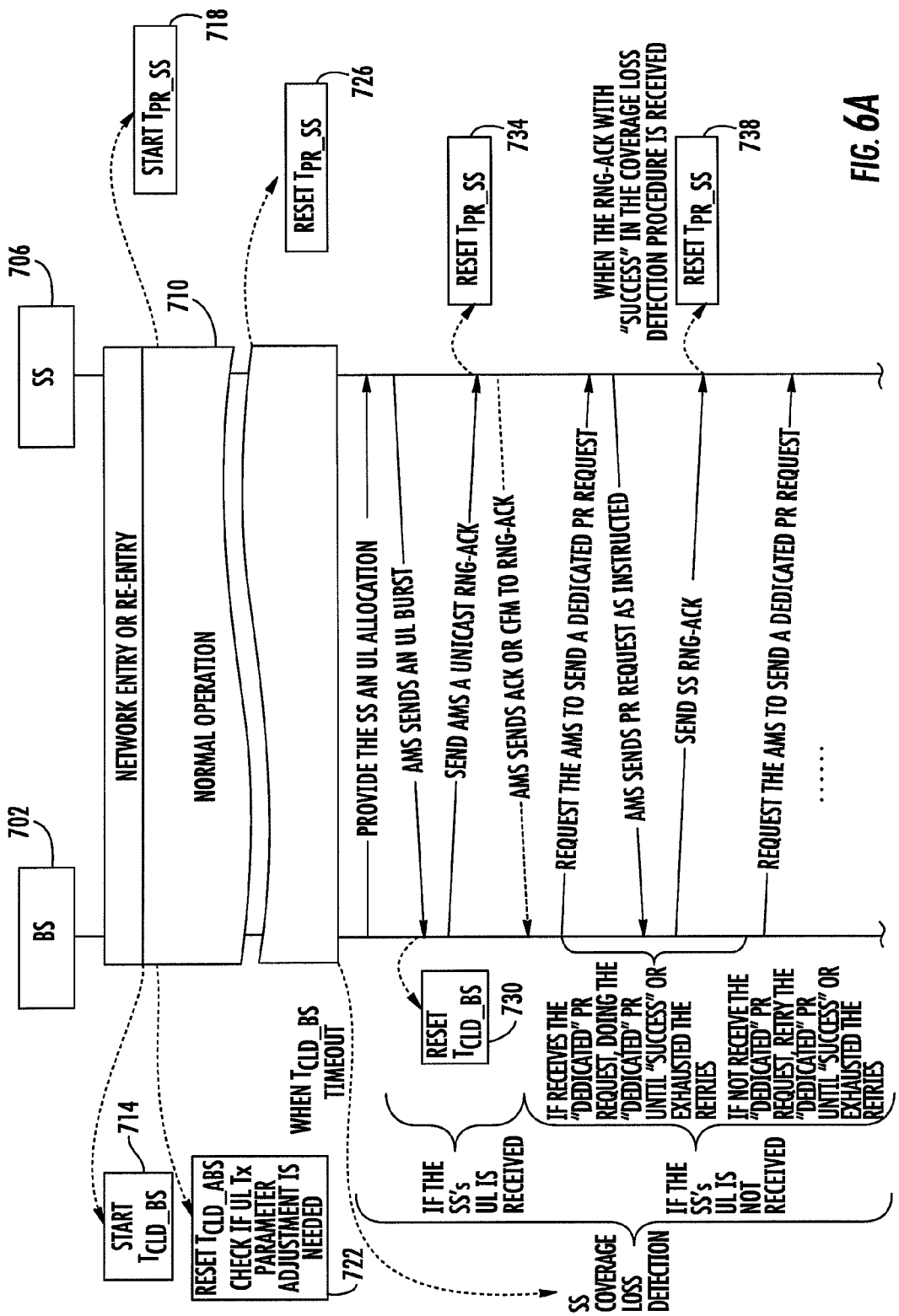
FIGS. 6A and 6B show an example of NS-ALUDP.
Figure 6B:
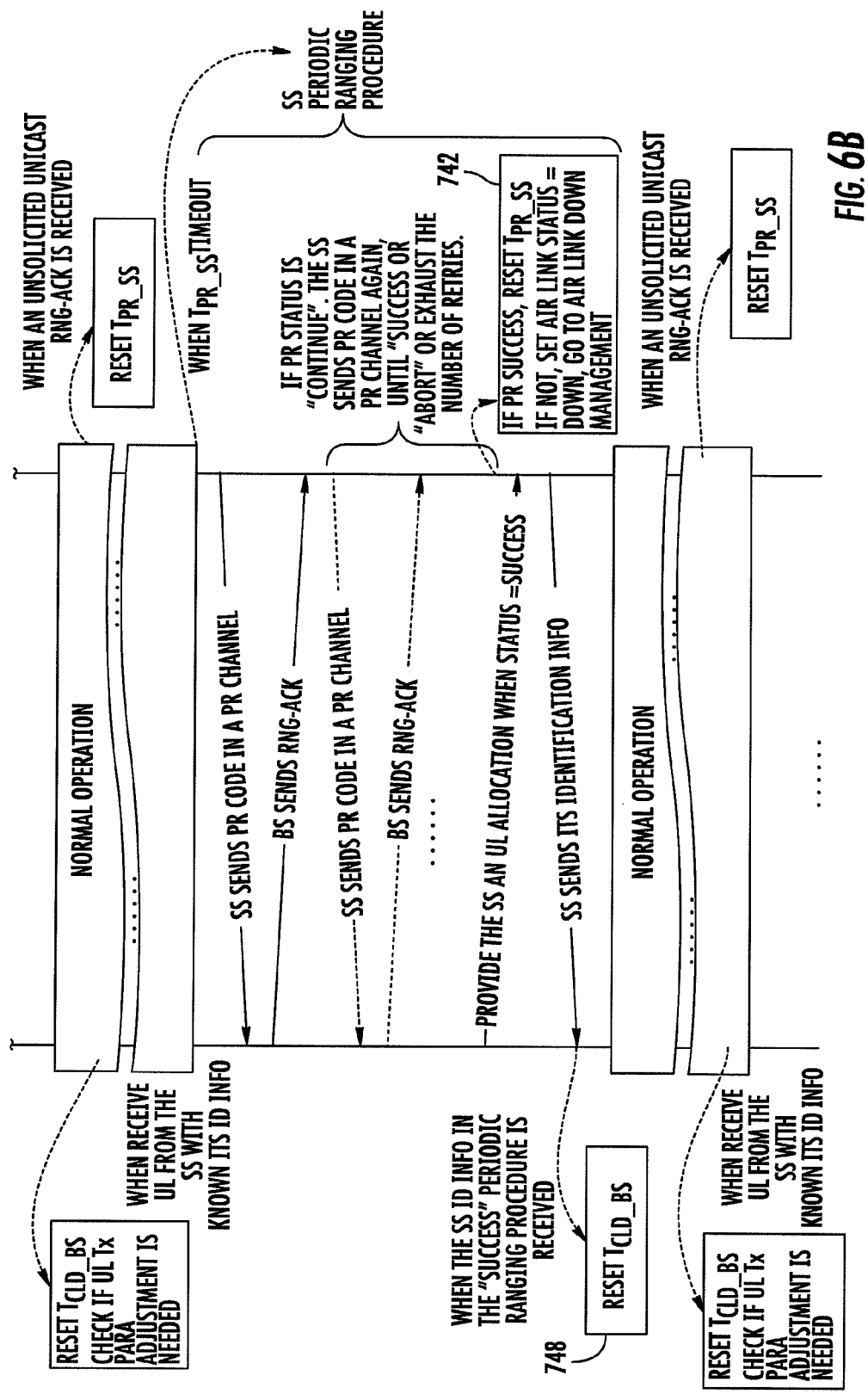

FIGS. 6A and 6B show an example of the procedural sequence diagram for a proposed NS-ALUDP showing a BS 702 and SS 706. Upon network entry or re-entry 710, and if the air link is up, the BS may start a coverage loss detection timer $T_{CLD\_BS}$ 714 and the SS may start a periodic ranging timer $T_{PR\_MS}$ 718. When the BS receives the UL from the SS with its ID information known, the $T_{CLD\_ABS}$ may be reset and the BS may check if the uplink transmission parameter adjustment is necessary 722. Similarly, at the SS, upon receipt of an unsolicited unicast ranging acknowledgement RNG-ACK, the SS may reset the $T_{PR\_SS}$ timer 726.

On a condition that the TCLD_BS times out, SS coverage loss detection procedures may begin. First, the BS may provide the SS with an UL allocation, to which the SS may send an UL burst. If the UL burst is received, the BS resets $T_{CLD\_BS}$ 730 and may send the SS a unicast RNG-ACK, and the SS may then reset the $T_{PR\_AMS}$ 734. The SS may then send an ACK of the RNG-ACK to the BS.

If the BS does not receive the SS's UL, the BS may request the SS to send a dedicated periodic ranging request and the AMS may send the PR request. This may be done until the PR request is received or the number of retries is exhausted. On a condition that the RNG_ACK is received, the SS resets the $T_{PR\_SS}$ timer 738.

FIG. 6B mostly shows the periodic ranging procedure between the BS 702 and SS 706 that may begin when the $T_{PR\_SS}$ times out. The SS may send a PR code in a PR channel to the BS. In response, the BS may send a RNG_ACK signal. If the PR status in this RNG_ACK is continue, these two steps are repeated until the SS receives a success or abort message, or the number or retries is exhausted.

If the SS sends a success status, the BS may respond by providing the SS with an UL allocation and also may reset the $T_{PR\_SS}$ 742. The SS then may send its identification information and the BS may reset the $T_{CLD\_BS}$ 748.

Regarding the mechanisms for the SS to identify itself to the BS after conducting a period ranging that is considered a "success," FIG. 6 shows that the BS may provide an UL allocation to the SS requesting that the SS transmit its identifier to the BS. Alternatively or additionally, the contention-based periodic ranging signal may carry embedded information of the SS's identification via the mechanisms described below. Alternatively or additionally, once periodic ranging status is a "success," the SS may use a contention-based bandwidth request mechanism to request an UL allocation, so that it may transmit its identification information to the BS.

Air Link Status During the Scheduled SS Absences

In addition to the un-intended or un-scheduled air link down exceptions caused by, for example, coverage loss or ungraceful departure of the SS, there may also be cases in which the BS knows that the SS is absent on the air link, which is called "scheduled SS absence" herein. During the SS absence, the SS may not be available to the BS for data transport. Examples may include sleep intervals, scanning intervals, HO process, and idle mode, in various systems, for example, 802.16m systems.

The air link status and its monitoring and management procedures may vary with the type of the scheduled SS absence, as different types have different absence durations and different ways to return to the normal operational mode. The following basic mechanisms for the air link status monitoring and/or management during scheduled SS absence may be used. The scheduled SS absence may be worked around, for example, by deferring the timer-triggered event until the SS returns. Alternatively or additionally, the air link status monitoring and management may work with the scheduled SS absence in a cooperative way, for example, by adjusting the ALUDP timer to fit into the SS's available periods. Alternatively or additionally, air link monitoring and/or management procedures may be stopped when the SS starts its scheduled absence, and may be re-started once the SS returns.

The following sections provide examples of the air link status and its monitoring/management procedures in different types of scheduled SS absences.

Scanning Intervals

The scanning mechanism in 802.16 systems is designed to allow the MS (in 802.16e) or AMS (in 802.16m) to scan the neighbor BS (in 802.16e) or ABS (in 802.16m) as one of the mechanisms for the MS/AMS's network topology acquisition. Before the MS/AMS starts the scanning procedure, it may negotiate with the BS regarding the relevant parameters for the scanning procedure. These parameters may include: the scanning interval (8-bit field, in unit of frame (5 ms) in 802.16e and in unit of subframe (0.617 ms) in 802.16m, for example, the max scanning interval is 1.28 s in 802.16e and 0.158 s in 802.16m); the available interval or "interleaving interval" (8-bit field, in unit of frame (5 ms) in 802.16e and in unit of subframe (0.617 ms) in 802.16m, for example, the maximum available interval is 1.28 s in 802.16e and 0.158 s in 802.16m); or the scan iteration (6-bit field, for example, the maximum scan iteration is 64). Therefore, the maximum duration for a scanning procedure may be 64*(1.28+1.28) s=163.84 s in 802.16e, and 64*(0.158+0.158) s=20.22 s in 802.16m.

Based on the 802.16e system profile, the periodic ranging timer value range may be 5 s to 35 s. This may be used as the reference for the air link monitoring/management time interval. The max scanning intervals in 802.16e and 802.16m may be smaller than the air link monitoring/management time interval, but the max duration of a scanning procedure may be larger. Therefore, the scanning mechanism and the air link monitoring/management mechanism may interleave with each other.

Additionally, interleaved with the scanning intervals, the available intervals require the SS to be able available to communicate with the BS for data transportation over the air link. Therefore, the SS may need to stay synchronized with the BS in both DL and UL directions during the scanning procedure.

In order to maintain the SS's synchronization with the BS during the scanning procedure, one or a combination of the following alternatives may be used. In a first alternative, the air link monitoring/management mechanisms may be kept running. For example, the used timers may still be running and their timeout events may still be valid. However, if a timeout event occurs during the SS's scanning interval, the air link monitoring/management procedure triggered by the timeout event may be deferred to the next available interval of the SS.

Alternatively or additionally, in a second alternative, the air link monitoring/management mechanisms may cooperate with the scanning reporting mechanism to eliminate or minimize the interference between the air link monitoring/management procedure and the scanning procedure. Scanning reports may be required in the scanning procedure. For example, in the 802.16e system profile, the maximum interval before reporting any scanning results is 2 s. A successful scanning report transmission at SS and a successful scanning report reception at BS may be valid indicators of the air link status, which may be used as the triggers to reset the timers used in the air link monitoring/management procedures.

Sleep Intervals

Once sleep mode is activated in 802.16m for an SS, the SS may be provided with a series of sleep cycles that comprise a listening window (also called a "listening interval") followed by a sleep window (also called a "sleep interval"). The sleep mode activation and termination may be accomplished through explicit medium access control (MAC) signaling, for example, MAC control messages. At sleep mode initialization, the initial sleep cycle, final sleep cycle, and listening window size may be provided. During the sleep mode, the sleep cycle length may be changed when certain conditions are met, for example, if there is no traffic for the SS, then the sleep cycle may be doubled until reaching the final sleep cycle. The change in a sleep cycle usually implies a change in the sleep interval, as the listening window normally stays the same. During the listening interval, the SS may monitor and receive via the DL direction and may also send in the UL direction if needed.

The 802.16m sleep mode timing related parameters may be summarized as follows: listening interval (1 frame to 16 frame or 5 ms to 80 ms); minimum sleep cycle (listening interval to 16 frames); max sleep cycle (sleep cycle to 1024 frames or 5120 ms); and sleep interval (sleep cycle— listening interval or 1 frame to 1023 frames or 5 ms to 5115 ms).

Similarly, based on the 802.16e system profile, the periodic ranging timer value range is 5 s to 35 s, which is the reference that may be used for the air link status monitoring/management time interval.

The maximum sleep interval in 802.16m is approximately 5.115 s, which may be close to the air link status monitoring/management time interval. The interleaving between the sleep intervals and air link status monitoring/management intervals may impact both mechanisms and may need to be carefully handled.

Interleaved with the sleep intervals, the listening intervals in the sleep mode may require the SS to be able available to monitor and receive in the DL direction and possibly transmit in the UL direction. Therefore, the SS may need to stay synchronized (or "connected") with the BS in both DL and UL directions during the sleep mode activation.

One or a combination of the following alternatives may be used to handle the air link status monitoring/management in the sleep mode. In a first alternative, the air link monitoring/management mechanisms may be kept running. For example, the used timers may still run and their timeout events may still be valid. However, if a timeout event happens during the SS's sleep interval, then the air link monitoring/management procedure triggered by the timeout event may be deferred to the next listening interval of the SS.

Alternatively or additionally, in a second alternative, the air link monitoring/management mechanisms may cooperate with the sleep mode to improve its efficiency and also minimize the interference with the sleep mode. For example, cooperation may include the BS providing the SS with a dedicated periodic ranging opportunity during its listening windows with an interval equal to or slightly smaller than the air link status monitoring/management interval. Through a periodic ranging procedure with given dedicated ranging opportunity, the air link synchronization between the SS and the BS may be maintained and the timers used for air link status monitoring/management may be reset.

Handover

There are two sub-types of the scheduled SS BSence for the HO cases: "during HO execution" and "after HO-complete." For the sub-type of during HO-execution, the serving BS may know that the SS is not available on the air link when it is conducting HO procedures. For example, the BS may be trying to associate with the target BS. Such a scheduled SS absence may typically be short in duration and the BS may expect a quick result: either the SS moved away or the SS is coming back. Therefore, during this type of scheduled SS absence, at both the BS side and the SS side, the air link status monitoring/management procedures may be suspended temporarily, and further decisions may be made based upon the HO results. If the HO result is not HO-complete, then the air link status monitoring/management procedures at the BS and the SS may be resumed.

For the sub-type of after HO-complete, the serving BS may know that the SS has been successfully handed over to another BS. Therefore, the BS may stop the air link status monitoring/management procedures on the air link with the SS and the SS may start the air link status monitoring/management procedures on the air link with the new serving BS.

Idle Mode

Before entering the Idle mode in 802.16 systems, the SS may deregister itself from the current serving BS, which may indicate the SS's BSence to the BS. Also, when an SS goes into Idle mode, there may be no information available to the BS regarding the duration of the SS's absence. During Idle mode, the SS may need to monitor the paging message and conduct a location update as necessary. However, the location update may not necessarily be with the BS with which it initiated its Idle mode. Returning to normal operation may require the SS to complete the network entry process. Therefore, at the BS side, the air link status monitoring/management procedure for an air link to an idle-mode SS may be stopped. At the SS side, the air link status monitoring/management procedure may be governed by Idle mode-specific functions, for example, paging or a location update.

Enhancements for the Coverage Loss Detection Scheme

Described herein are mechanisms that are designed to enhance the 802.16m coverage loss detection scheme, which of course can be combined with the above described steps as well. For example, in the 802.16m coverage loss detection procedure, the BS may instruct the SS to use the periodic ranging code/channel. After receiving an AAI_RNG-ACK with a "success" status, the SS may send a bandwidth request to the BS for an UL allocation requesting the SS to send the SS's identification information. The BS may be able to get the SS's identification information via the coverage loss detection scheme after a successful periodic ranging in a more efficient manner. The following mechanisms may improve the efficiency of the coverage loss detection scheme.

In one alternative, during the coverage loss detection procedure, if the BS needs to invite the SS to conduct periodic ranging, the BS may provide the SS with a dedicated periodic ranging request opportunity, for example, a periodic ranging code in a periodic ranging channel. Thus, the BS may retain knowledge of the SS's identification, so that there may not be a need for the SS to transmit its identification information to the BS after the periodic ranging is successfully accomplished. Therefore, it may save the steps of UL bandwidth request, UL bandwidth allocation, and the SS's identification transmission in the coverage loss detection process.

Alternatively or additionally, the BS may provide the SS with a unicast UL allocation by using a CDMA allocation IE after a successful periodic ranging, so that the step of bandwidth request may be avoided.

Alternatively or additionally, the STID may be mapped onto specific ranging codes and/or ranging opportunities using the mechanisms described below.

Enhancements for the Periodic Ranging Scheme

Described herein are mechanisms designed to enhance the periodic ranging scheme in the 802.16m by eliminating unnecessary periodic ranging procedure executions. According to 802.16m, if the SS is active with data traffic from the BS and there is no need to adjust the SS's UL transmission parameters, the SS's periodic ranging timer may still run and may trigger the SS to conduct periodic ranging, which may be unnecessary. One or a combination of the following alternatives may be used to address this issue: (1) using a periodic timer at the BS side; or (2) resetting the SS periodic timer on a condition that a successful UL transmission was conducted.

Use a Periodic Timer at BS Side

The BS may also manage a periodic ranging timer for each SS, for example, a timer called $T_{PR\_BS}$. Upon a timeout, the BS may check whether it has valid information regarding the SS's UL status. If so, then the BS may send an unsolicited RNG-ACK with status "success", so that the SS may reset its periodic ranging timer. If the BS does not have a valid SS UL status, then the BS may not do anything and may allow the SS's periodic ranging timer to trigger the SS to conduct a random access-based periodic ranging process.

There may be multiple ways to determine whether the BS has a valid SS UL status. One example is similar to the use of the last UL traffic elapse-time counter, $C_{L\_UP}$, and the pre-defined maximum time interval for a valid UL status, $I_{MAX\_UL}$, in the S-ALUDP as described above. If the BS periodic ranging timer, $T_{PR\_BS}$, timeouts, it may first check whether $C_{L\_UP} <= I_{MAX\_UL}$. If so, then the BS has a valid UL status for the SS; otherwise, the BS does not have a valid UL status for the SS.

Alternatively or additionally, the BS may put a timestamp on the UL status for the SS, to record the most recent reception in the UL direction from the SS. If the BS periodic ranging timer, $T_{PR\_BS}$, timeouts, it may first check whether the timestamp of the SS UL status is older than one periodic ranging time interval. If it is not older, then the BS has a valid SS UL status; otherwise, the BS does not have a valid SS UL status.

The BS periodic ranging timer, $T_{PR\_BS}$, may start once the air link between the BS and the SS enters the operational mode at network entry or re-entry. It may reset every time the BS conducts the periodic ranging procedure triggered by the $T_{PR\_BS}$ timeout. Its value may be set to the same value as the SS period ranging timer, $T_{PR\_SS}$, or may be set to a value slightly smaller than the SS periodic ranging timer, $T_{PR\_SS}$. A slightly smaller value of $T_{PR\_BS}$ than $T_{PR\_SS}$ may avoid the periodic ranging timers at the BS side and the SS side timing out at the same time or at a time very close to each other.

During the SS's periodic ranging procedure, if the SS receives a unicast ranging status indication message from the BS, the SS may stop its periodic ranging procedure and may follow the instructions given in the received ranging status indication message.

Reset the SS Periodic Timer after a Successful UL Transmission

Alternatively or additionally, the unnecessary periodic ranging procedure executions may be eliminated by resetting the SS periodic timer on a condition that the SS has completed a successful UL transmission. A successful UL transmission may be indicated by the reception of the hybrid automatic repeat request (HARQ) acknowledgement (ACK) corresponding to the UL transmission. The HARQ may be mandatory for unicast data bursts in 802.16m systems.

Mapping STID onto Ranging Codes and/or Ranging Opportunities

An SS has a unique STID. Rather than have the SS randomly select values, this 12-bit STID value may be used to select a ranging code and/or ranging opportunity. The number of unique codes available for periodic ranging may be 8, 16, 24, or 32, and one of multiple ranging opportunities may be selected. The BS may map the received ranging code and opportunity back to the STID of the transmitter. Because there may be more than one STID mapping to the same ranging code/opportunity, there are several possibilities: (1) the received ranging code maps back to one active STID, in which case the BS may deterministically know which SS sent the periodic ranging code; (2) the received ranging code maps to multiple STIDs, in which case the BS may use its knowledge of which SSs are transmitting periodic ranging codes and may reduce the set to a single STID; or (3) if the BS is unable to know with certainty that only one SS sent the periodic ranging code, it may allocate an UL resource for the SS to send its ID information on.

Selecting Ranging Codes and/or Opportunities Using STID

Ranging codes and/or ranging opportunities may be selected using STIDs. If the SS uses, for example, the least significant 5 bits to index the ranging code it will send, then the BS may have an indication as to which SS(s) are transmitting a ranging code. Similarly, if the STID is used to select a transmit opportunity, then the BS may have an indication as to the identity of the transmitting SS. A combination of ranging code and ranging opportunity selection based on the STID may provide the BS with an identity that is unique and may allow the BS to determine the STID of the transmitting SS. An alternative mapping may be used to distinguish a STID-based mapping from a random selection. For example, a single bit in the ranging code index may be used to indicate that the ranging code is associated with the SSs STID. In this example, the SS may use the least significant 4 bits to index the ranging code to send, and set the 5th bit to '1' to indicate that this is an STID selection. The SS may also select a 4-bit index for the ranging code and leave the 5th bit at '0' to indicate that this is a random selection and the BS may not interpret the code as an indication of STID.

Selecting Ranging Codes and/or Opportunities Using a Hash Code

A potential problem with using the low N bits of the STID to index, for example, a ranging code, is that the number of available ranging codes may be a value that is not a power of 2, as in the case where 24 ranging codes are available. This problem may be resolved by using a hash value that represents the STID. This hash value has a range of 0 to $N_{codes}-1$, where $N_{codes}$ is the number of available ranging codes. If the BS assigns the SS STID, it may also generate the hash value. The SS may be sent a signal indicating the STID and, optionally, the ranging code and/or opportunity hash value. In this case, the BS may reverse look-up the STID based on the ranging code and/or opportunity, and it may also know whether two or more SSs in a given sector are in periodic ranging mode at the same time. If this is the case, the BS may assume collisions and handle those special cases in a manner similar to the current procedures well-known in the art.

Two hash codes may be used: one for the ranging code and another for the ranging opportunity. If the hash functions are chosen correctly, two STIDs mapping to the same ranging code may map to different ranging opportunities, possibly reducing the likelihood of STID decode collisions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for detecting coverage loss at a base station (BS), the method comprising:
    starting a coverage loss detection (CLD) timer for a subscriber station (SS) to perform a CLD procedure;
    on a condition that the CLD timer for the SS expires during the CLD procedure:
        allocating an uplink (UL) grant to the SS to enable identification of the status of the SS during the CLD procedure;
        receiving an UL data burst from the SS via the allocated UL grant during the CLD procedure;
        resetting the CLD timer for the SS based on the received UL data burst from the SS during the CLD procedure; and
        transmitting an unsolicited unicast ranging acknowledgement (RNG-ACK) to the SS based on the received UL data burst from the SS during the CLD procedure, wherein the unsolicited unicast RNG-ACK enables the SS, which has previously started a periodic ranging timer associated with a periodic ranging procedure, to reset the periodic ranging timer.

2. The method of claim 1, wherein the CLD timer for the SS is started upon an initial network entry of the SS.

3. The method of claim 1, wherein the CLD timer for the SS is started upon a network reentry of the SS.

4. The method of claim 1, wherein the UL data burst includes identification information of the SS.

5. The method of claim 1, further comprising:
    determining whether an UL transmission parameter adjustment is required.

6. The method of claim 1, further comprising:
    on a condition that the CLD timer for the SS expires during a scanning interval of the SS:
        deferring allocating an uplink (UL) grant to the SS to identify the status of the SS to a next available interleaving interval of the SS.

7. The method of claim 6, further comprising:
    detecting the next available interleaving interval of the SS.

8. A base station (BS) configured to detect coverage loss, the BS comprising:
    a coverage loss detection (CLD) timer capable of being started for a subscriber station (SS) to perform a CLD procedure;
    a transmitter configured to allocate an uplink (UL) grant to the SS to enable identification of the status of the SS during the CLD procedure;
    a receiver configured to receive an UL data burst from the SS via the allocated UL grant during the CLD procedure;
    a processor configured to reset the CLD timer for the SS based on the received UL data burst from the SS during the CLD procedure; and
    the transmitter further configured to transmit an unsolicited unicast ranging acknowledgement (RNG-ACK) to the SS based on the received UL data burst from the SS during the CLD procedure, wherein the unsolicited unicast RNG-ACK enables the SS, which has previously started a periodic ranging timer associated with a periodic ranging procedure, to reset the periodic ranging timer.

9. The BS of claim 8, wherein the CLD timer for the SS is started upon an initial network entry of the MS.

10. The BS of claim 8, wherein the CLD timer for the MS is started upon a network reentry of the MS.

11. The BS of claim 8, wherein the UL data burst includes identification information of the SS.

12. The BS of claim 8, wherein the processor is further configured to determine whether an UL transmission parameter adjustment is required.

13. The BS of claim 8, wherein the transmitter is further configured to defer allocating an uplink (UL) grant to the SS to identify the status of the SS to a next available interleaving interval of the SS on a condition that the CLD timer for the SS expires during a scanning interval of the SS.

14. The BS of claim 13, wherein the receiver is further configured to detect the next available interleaving interval of the SS.

* * * * *

UNITED STATES PATENT AND TRADEMARK OFFICE
CERTIFICATE OF CORRECTION

PATENT NO. : 9,544,941 B2  
APPLICATION NO. : 13/173858  
DATED : January 10, 2017  
INVENTOR(S) : Wang et al.

Page 1 of 1

It is certified that error appears in the above-identified patent and that said Letters Patent is hereby corrected as shown below:

On the Title Page

Item (57) ABSTRACT, Line 2, after "ALUDP", delete "(S-ALUPD)" and insert --(S-ALUDP)--.

Signed and Sealed this  
Fourteenth Day of March, 2017

Michelle K. Lee  
*Director of the United States Patent and Trademark Office*